March 31, 1970 A. D. RITTMANN ET AL 3,504,202

SILICON GATED RECTIFIER CONTROL CIRCUIT

Filed May 16, 1967

INVENTORS
Albert D. Rittmann &
BY Robert E. Knolinski
Robert E. Fowler
ATTORNEY

United States Patent Office 3,504,202

Patented Mar. 31, 1970

3,504,202

SILICON GATED RECTIFIER CONTROL CIRCUIT

Albert D. Rittmann and Robert E. Knolinski, Kokomo, Ind., assignors to General Motors Corporation, Detroit, Mich., a corporation of Delaware Filed May 16, 1967, Ser. No. 638,778

Int. Cl. H03k *17/26*

U.S. Cl. 307—293 1 Claim

ABSTRACT OF THE DISCLOSURE

A temperature and power variation insensitive solid state control system utilizing a silicon controlled rectifier for switching a load.

The present trend in control system circuitry is toward extending the use of solid state devices. Since these devices have been developed to handle adequate current and voltage requirements, they offer many advantages. One of the major ones is that such devices have no moving parts and, therefore, require much less service over long periods of time. The present system operates from a DC source of power and provides a preset delay after application of such power to control energization of a load which is independent of variations in applied voltage, ambient temperature variation, transistor gain or SCR firing sensitivity.

Referring briefly to the drawings.

Figures 1, 2, 3, 4, 5:
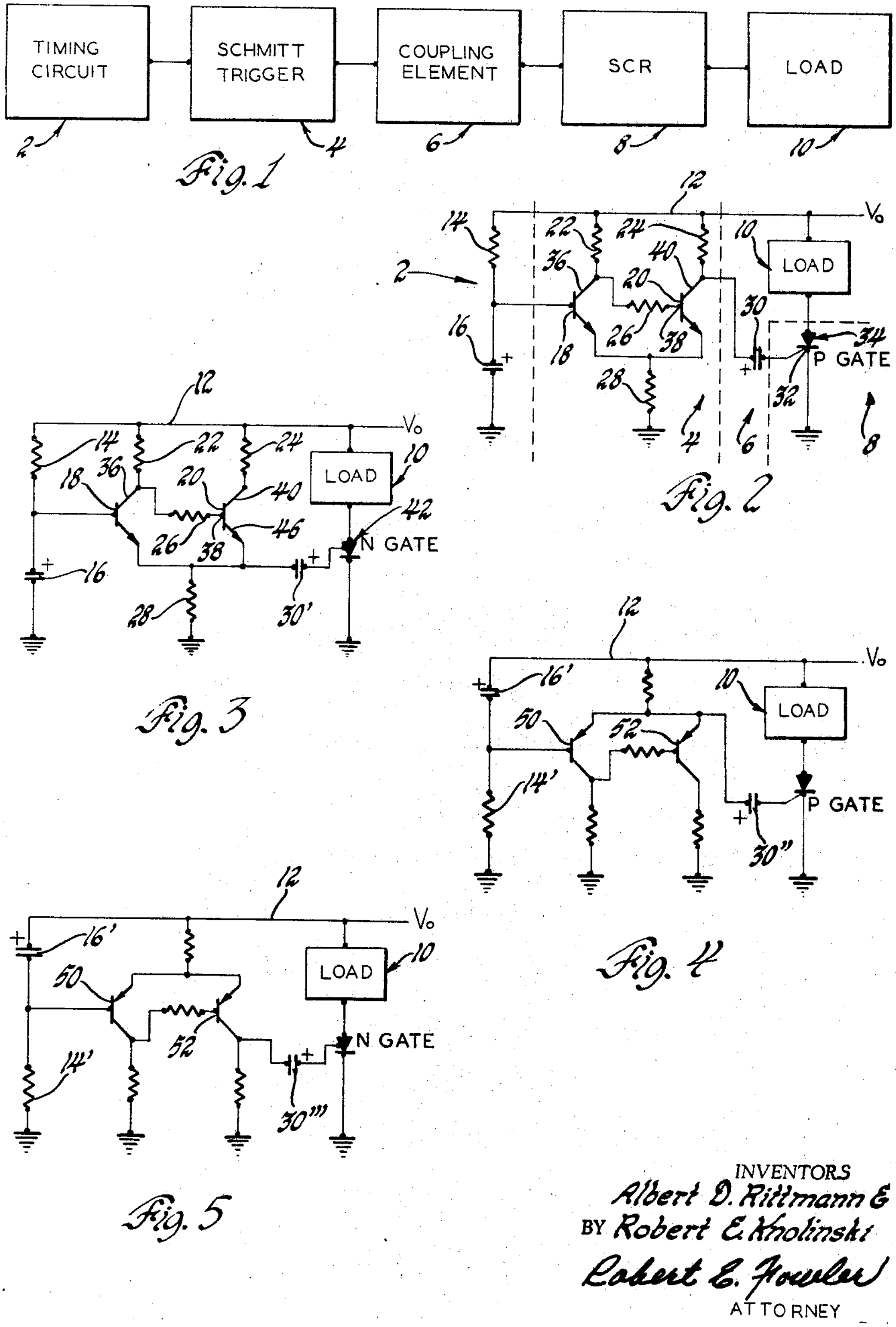
FIGURE 1 is a block diagram illustrating the various parts of the control system of the invention.
FIGURE 2 is a circuit diagram of a control system embodying the invention.
FIGURES 3, 4 and 5 are each circuit diagrams of modified forms of the control system utilizing different types of transistors and gate type SCR devices.

The principle parts of the system are shown in FIGURE 1. As stated, it consists of a delayed control system for switching a load a desired time after power is applied. The first portion of the system is a timing circuit shown in FIGURE 1 by block 2. This timing section controls a Schmitt trigger or flip-flop circuit block 4. A coupling element 6 connects the trigger circuit 4 to the silicon controlled rectifier 8 which in turn controls the load 10.

Specific circuitry for the system is shown in FIGURE 2, the various portions being separated by dashed lines and identified by the same reference characters as those of the FIGURE 1 block diagram. The electrical power supply is connected to terminal V*o* and appears on supply line 12. The timing circuit consist of resistance 14 in series circuit with condenser 16 between power line 12 and ground. The time period is determined by the charging rate of the condenser. The trigger circuit 4 includes the two NPN transistors 18 and 20 and the interconnecting and biasing resistances 22, 24, 26 and 28 as shown. The coupling element 6 is specifically a coupling condenser 30. The coupling condenser 30 is connected between the collector 40 of transistor 20 and the gate electrode 32 of the SCR 34. The SCR shown in FIGURE 2 is of the P gate type and is connected in series circuit wtih the load 10 and controls the flow of current therethrough.

When power is applied to line 12, transistor 18 is initially off and transistor 20 is on or conducting due to the biasing ararngement and the SCR 34 is nonconducting or off. Condenser 16 begins to charge through resistance 14. When the voltage on the positive plates of the capacitor 16 exceeds the emitter voltage on transistor 18, that transistor begins to conduct. The voltage at its collector begins to drop and also the voltage on base 38 of transistor 20 connected thereto begins to drop with it. Transistor 20 turns off and transistor 18 turns on. This occurs very quickly. Collector 40 voltage rises rapidly as does the voltage on the positive plate of the coupling capacitor 30. This rises to the line voltage, causes firing the SCR 34 and an energizing of the load 10. The load will remain energized until the supply voltage is removed from line 12 at which time the SCR will turn off and the trigger circuit 18–20 return to that condition or normal state with transistor 18 off and 20 on. The time interval provided by resistance 14 and capacitor 16 in charging the latter will determine the time period after the application of power V*o* before the SCR fires and the load is energized.

The SCR 34 of FIGURE 2 is a P gate type. FIGURE 3 shows a modified form of control circuit which is similar in all respects to that shown in FIGURE 2 except that the SCR 42 is an N gate type. The coupling condenser 30' has one plate connected to the gate of the SCR and the opposite plate connected to the emitter 46 of the transistor 20. Otherwise the circuit of FIGURE 3 is the same as that of FIGURE 2. The operation of the circuit of FIGURE 3 is identical with that of FIGURE 2 insofar as turning on the load a predetermined time after application of voltage V*o* to line 12. In FIGURE 3, however, when 20 turns off, the voltage of emitter 46 decreases drawing charge current for condenser 30' from the SCR gate. This will fire the SCR 42 and energize the load 10.

FIGURES 4 and 5 show further modifications of the basic control circuit shown in FIGURE 2 utilizing PNP transistors 50 and 52 in the Schmitt trigger circuit instead of the NPN type shown in FIGURES 2 and 3. When using PNP transistors with both a P and N type gate SCR as shown in FIGURES 4 and 5 respectively, the condenser 16' is reversed and moved to a position between the power line 12 and the base of the transistor 50, and the resistor 14' in series therewith is connected between base and ground. The connections of the coupling condensers 30'' and 30''' in FIGURES 4 and 5 are similar to 30 and 30' in FIGURES 2 and 3.

The circuits of FIGURES 4 and 5 operate with transistor 50 normally off and 52 normally on as in the first instance. Charging of condenser 16' when the power is applied turns transistor 50 on and transistor 52 off to trigger the SCR and energize the load as before.

We claim:

1. A solid state time delay control system for controlling power supplied to a load, comprising: a pair of supply terminals connectable to voltage occurring across opposite poles of a source of direct current power; a timing circuit including a condenser and a resistance connected together and across said supply terminals, the charging time of said condenser providing a predetermined time delay period after voltage is developed across said supply terminals; a bistable trigger circuit including first and second transistors respectively including base, emitter and collector means connecting said emitters of said first and second transistors together and to one of said supply terminals; means respectively connecting said collectors of said first and second transistors to the other of said supply terminals; means connecting said base of said first transistor to said condenser so that said first transistor is rendered conductive and nonconductive in response to voltage developed across said condenser; means coupling the collector of said first transistor to the base of said second transistor whereby said first and second transistors have two stable conductive and nonconductive states with the stable state of one transistor being opposite the stable state of the other transistor; a load; a silicon controlled rectifier having gate, anode and cathode; means connecting said load in series with said anode and said cathode of said silicon controlled rectifier and between said supply terminals; and a capacitor coupling means connected between the gate of said silicon controlled rectifier and said second transistor to render said silicon controlled rectifier conductive in response to a change in voltage occurring across the emitter and collector of said second transistor when said second transistor changes from one stable state to a second stable state after said predetermined time delay period, said silicon controlled rectifier being made conductive to energize said load from voltage occurring between said supply terminals and remaining conductive independently of the stable states of said first and second transistors of said bistable trigger circuit.

References Cited

UNITED STATES PATENTS

| | | | | |
|---|---|---|---|---|
| 3,320,440 | 5/1967 | Reed | 307—252 | XR |
| 3,417,296 | 12/1968 | Wallentowitz | 307—293 | XR |

OTHER REFERENCES

IBM Technical Disclosure Bulletin, vol. 9, No. 5, October 1966, p. 527, "Variable and Recoverable Time Delay for Control System," by T. R. Fredriksen.

JOHN S. HEYMAN, Primary Examiner

JOHN ZAZWORSKY, Assistant Examiner

U.S. Cl. X.R.

307—252, 824, 290